United States Patent [19]

Huitema

[11] 4,290,322

[45] Sep. 22, 1981

[54] ELECTRONIC TRANSMISSION CONTROL

[75] Inventor: Thomas W. Huitema, Racine, Wis.

[73] Assignee: J. I. Case Company, Racine, Wis.

[21] Appl. No.: 42,514

[22] Filed: May 25, 1979

[51] Int. Cl.³ .......................... F16H 3/74; F16H 57/10
[52] U.S. Cl. .................................. 74/752 A; 74/752 B;
74/752 C; 74/761
[58] Field of Search ................. 74/761, 752 A, 752 C,
74/752 B, DIG. 6, 740; 192/109 F

[56] References Cited

U.S. PATENT DOCUMENTS

| | | | |
|---|---|---|---|
| 3,031,901 | 5/1962 | Simpson | 74/761 X |
| 3,274,858 | 9/1966 | Meyer et al. | 74/761 |
| 3,469,472 | 9/1969 | Bislew | 74/761 |
| 3,754,482 | 8/1973 | Sanders et al. | 74/752 A |
| 3,796,114 | 3/1974 | Taylor | 74/761 |
| 3,823,621 | 7/1974 | Kubo et al. | 74/752 A |
| 4,089,238 | 5/1978 | Forster | 74/761 X |

Primary Examiner—Leslie Braun
Attorney, Agent, or Firm—Dressler, Goldsmith, Shore, Sutker & Milnamow, Ltd.

[57] ABSTRACT

A control system for a multi-speed transmission having a plurality of friction devices with at least two friction devices being engaged for each speed range includes an electric circuit for controlling the supply of pressurized fluid from a source to and from the friction devices. The electric circuit includes pressure sensing means to maintain a friction device that is to be disengaged in an engaged position until the friction device that is to be engaged reaches a certain fluid pressure value to produce a power shift.

16 Claims, 7 Drawing Figures

ELECTRONIC TRANSMISSION CONTROL

DESCRIPTION

TECHNICAL FIELD

The present invention relates to multi-speed transmissions of the type disclosed in Bislew U.S. Pat. No. 3,469,472 and more particularly to an improved control system for shifting a transmission unit between a plurality of speeds.

The transmission unit disclosed in the Bislew patent, which is incorporated herein by reference, consists of a multi-speed planetary drive unit coupled with a multi-speed sliding gear unit so that the vehicle, such as an agricultural tractor, can be operated at a plurality of ground speeds. The transmission unit disclosed in the Bislew patent is controlled through a hydraulic control system and requires that two fluid operated friction devices be simultaneously pressurized for any given transmission speed. In the Bislew patent, the selection of the two friction devices that are to be actuated is made through a selector valve that is movable between a plurality of positions.

BACKGROUND ART

The transmission control unit disclosed in the Bislew patent has met with a remarkable degree of commercial success and has been used for several years for most tractors manufactured by the assignee of the present invention. However, one problem has been detected in the hydraulic control system disclosed in the Bislew patent and relates to serviceability. In the control system disclosed in the Bislew patent, all of the valve components are incorporated into a single housing which means that if any one of the components, such as one of the valve bores, becomes defective, the entire unit must be replaced. This requires a substantial amount of time and is a fairly expensive proposition.

Another problem encountered in the control system disclosed in this patent is the fact that there is a small increment of delay when the transmission unit is shifted from one gear to another since the shifting requires de-pressurization of one friction device and pressurization of a second friction device which, of course, cannot be accomplished instantaneously.

Various other proposals have been made for controlling friction devices and these are disclosed in the following United States patents: U.S. Pat. Nos. 2,765,893, 2,792,714, 2,848,080, 2,991,862, 3,164,232, 3,237,734, 3,300,004, 3,459,071, 3,460,656, 3,656,600 3,674,121, 3,796,114, 3,823,621.

SUMMARY OF THE INVENTION

According to the present invention, an electrical control system for a multi-speed transmission that is shifted through pressurization of a plurality of friction devices consists of a plurality of individual components that can be integrated into a control system so that any major component that becomes defective can be removed and replaced in a matter of minutes without affecting the remainder of the system. One of the significant features of the present invention is the fact that the shifting from one gear to another takes place without any drop in the driving force while the shift is being made and is relatively independent of the time required for the friction device that is being engaged to become fully pressurized.

More specifically, the transmission unit for which the present invention is designed consists of a multi-speed planetary unit that has four friction devices, two of which must be engaged for any given forward or reverse speed. The transmission unit is designed such that the output shaft from the planetary unit can be driven at three different forward output speeds, namely "low," "intermediate," and "high," as well as one "reverse" speed. The same planetary transmission unit can have the speeds doubled merely by adding an additional two-speed planetary unit between the engine and the input to the basic planetary unit so that the input shaft to the basic planetary unit can be operated at two different speeds for each of the speeds indicated above.

The control system for the fluid pressure-actuated friction devices includes a plurality of fluid valve means respectively supplying pressurized fluid to the friction devices and a pressure transducer associated with each friction device which provides an individual indication of fluid pressure operating on each friction device. A speed selector circuit controls a plurality of valve actuating means respectively associated with the respective valve means and a speed selector switch means for energizing a predetermined number of actuating means from an electric power source. The circuit also includes fluid pressure responsive holding means individually responsive to each of said pressure transducer means for maintaining a previously engaged fluid valve actuating means in an energized state until such time when a subsequently energized fluid valve actuating means has caused fluid pressure operating on the corresponding friction device to reach a predetermined value.

Each electric control system incorporates a plurality of solenoid operated valves which are of the on-off type and are shifted to the off position via a spring return and are actuated electrically through four separate control relays. The system also incorporates a plurality of pressure switches which prevent deenergizing of one engaged friction device until such time as the next friction device, which is to be engaged, reaches a predetermined pressure level to prevent the draw bar load from dropping during the shift, i.e., produce a power shift.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

Figure 2:
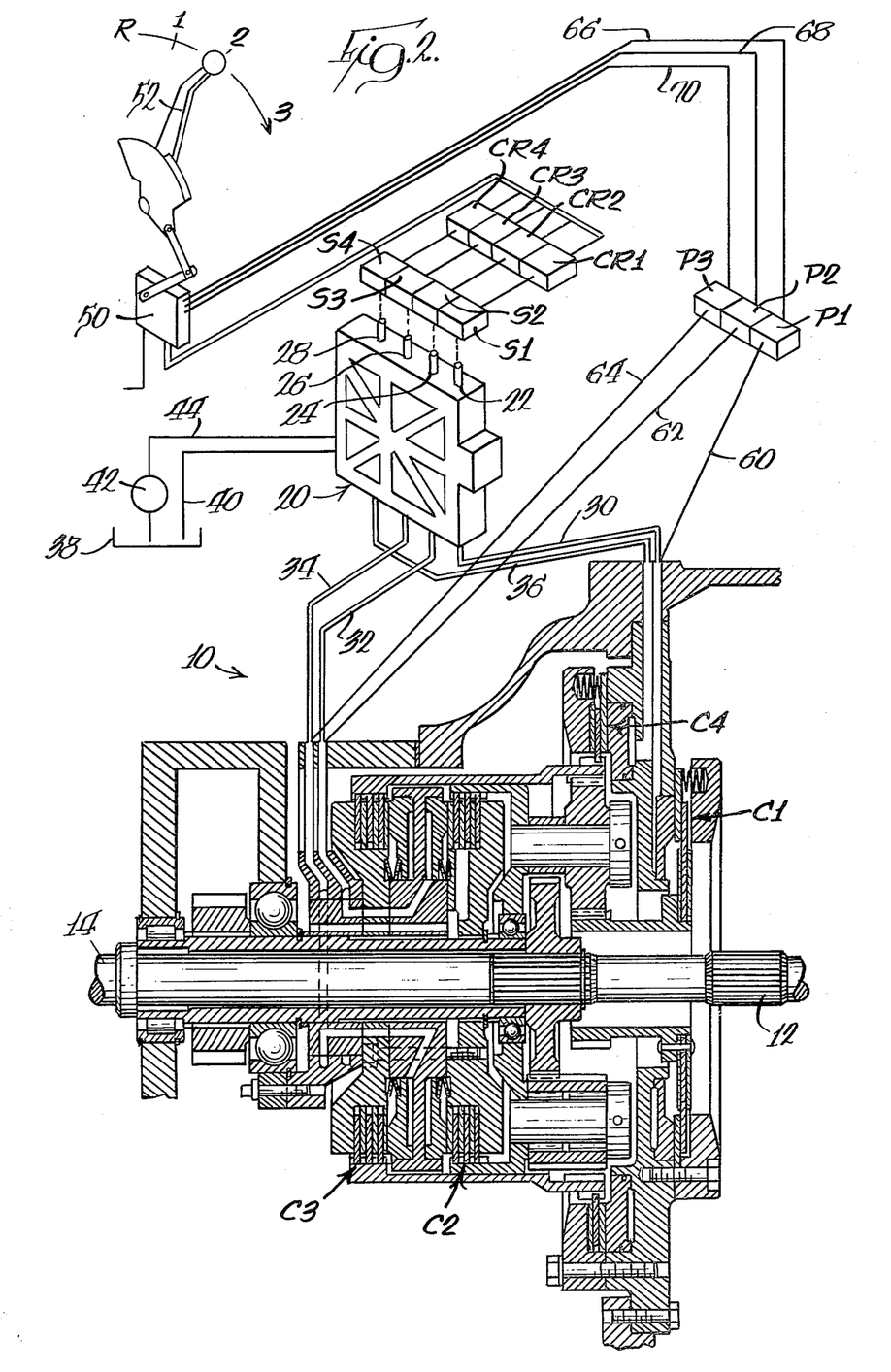
FIG. 2 is a schematic view illustrating the respective components and their relationship to each other.

Referring to FIG. 2 of the drawings, the multi-speed planetary transmission unit is generally designated by reference numeral 10 and has an input shaft 12 and an output shaft 14 which may be the input to a sliding gear transmission unit of the type disclosed in the above-mentioned Bislew patent. The planetary transmission unit 10 is also identical to the planetary transmission unit disclosed in the Bislew patent and reference may be had to the disclosure of that patent for the various details thereof. Since the transmission unit per se does not form any part of the present invention, a detailed description thereof does not appear to be necessary.

However, for purposes of a subsequent description, the transmission unit incorporates four friction devices C1, C2, C3 and C4, all of which are spring biased to a disengaged position and are moved to an engaged position by supplying pressurized fluid to chambers associated with each of the friction devices, two of which C2 and C3 operate between two rotating components and thus are properly called "clutches", and two of which C1 and C4 operate between a fixed component and a rotating component and are properly called "brakes"—since they stop relative motion.

The control system of the present invention incorporates a valve bank 20 that has four solenoid operated valves 22, 24, 26 and 28. Valves 22, 24, 26 and 28 are respectively connected to the respective chambers of clutches C1 through C4 through conduits 30, 32, 34, and 36 and are normally biased to a closed position wherein the respective chambers of the clutches are connected to a reservoir 38 through a conduit 40. Each of the valves has a solenoid, identified as S1, S2, S3, and S4, associated therewith which, when energized, will move an associated valve to a second position and connect a pressurized fluid source, such as a pump 42, to the associated chamber through a conduit 44. The respective solenoids S1-S4 have control relays, identified as CR1, CR2, CR3, and CR4 electrically connected thereto and the control relays are all connected to a range switch 50 that is operated through a control lever 52 as will be described later. The control circuit also incorporates three pressure switches P1, P2, and P3 which respectively have pressure transducer means associated therewith that are connected to the chambers of friction devices C1, C2, and C3 through sensing lines 60, 62, and 64.

As indicated above, two clutches must be engaged for each of the speeds of operation of the planetary unit and the following table represents which of the clutches is in the engaged position and which of the clutches is in the disengaged position for the respective four speeds of operation:

|  | C1 | C2 | C3 | C4 |
| --- | --- | --- | --- | --- |
| Rev. | OFF | ON | OFF | ON |
| Low | ON | ON | OFF | OFF |
| Inter. | ON | OFF | ON | OFF |

-continued

|  | C1 | C2 | C3 | C4 |
| --- | --- | --- | --- | --- |
| High | OFF | ON | ON | OFF |

The respective friction devices are engaged through actuation of control lever 52 to move the range switch between a plurality of positions.

Electric Selector Circuit

Figure 3:
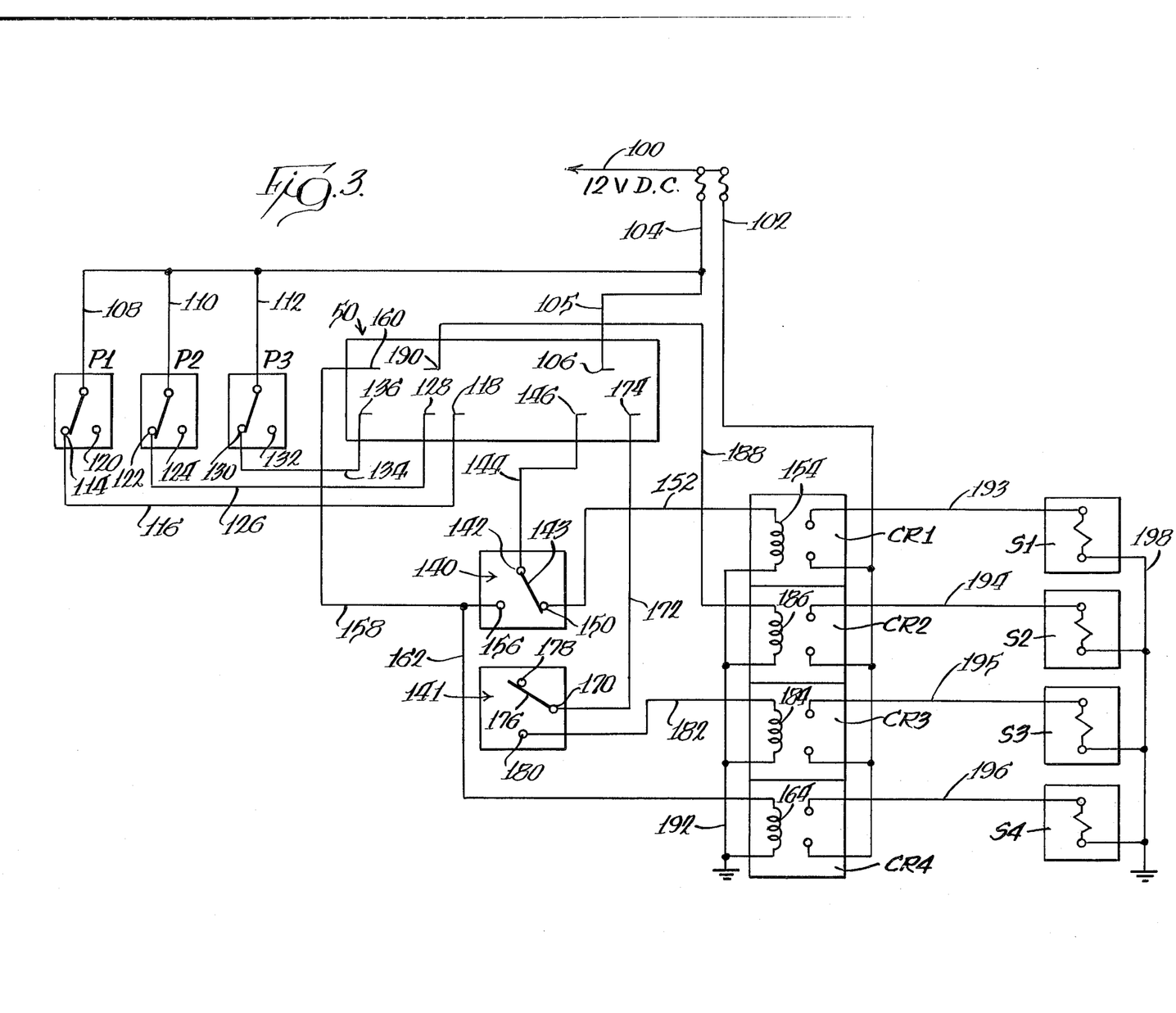
FIG. 3 discloses the electrical circuit for operating the transmission unit at a plurality of speeds.

The electrical control circuit of the present invention is illustrated in FIG. 3 and includes an electrical power source represented by line 100 which is connected directly to each of the control relays through a line 102. A separate line 104 leads from source 100 through an input line 105 to an input contact 106 in range switch or speed selector switch means 50 and also through lines 108, 110, and 112 to the input terminals of pressure switches or fluid pressure responsive holding means P1, P2, and P3.

Pressure switch P1 has a normally closed contact 114 connected by line 116 to a contact 118 in range switch 50 and has a second contact 120 which defines the normal open contact for pressure switch P1. Likewise pressure switch P2 has a normally closed contact 122 and a normally open contact 124 with contact 122 connected by line 126 to a contact 128 in range switch 50. Pressure switch P3 has a normally closed contact 130 and a normally open contact 132 with normally closed contact 130 connected by line 134 to a contact 136 in range switch 50.

The electrical circuit also includes a pair of mechanically actuated switches 140 and 141 which are operated in a manner that will be described later. Mechanical switch 140 has an input contact 142 having a switch arm 143 connected thereto and connected by line 144 to a contact 146 of range switch 50. Mechanical switch 140 also has a normally closed contact 150 connected by line 152 to one end of a relay coil 154 in control relay CR1 while a second or normally open contact 156 is connected by a line 158 to a further contact 160 in range switch 50. Line 158 is also connected through a branch line 162 to one end of a relay coil 164 in control relay CR4.

The second mechanical switch 141 has an input contact 170 connected by line 172 to the contact 174 in range switch 50. Switch 141 is a two-position switch and has an actuator or switch arm 176 movable between a normally closed contact 178 and a normally open contact 180. Normally open contact 180 is connected by line 182 to one end of a relay coil 184 in control relay CR3.

The remaining control relay CR2 has one end of a relay coil 186 connected by a line 188 to a contact 190 while the opposite ends of all of the relay coils 154, 164, 184, and 186 are grounded by a common ground 192. Each of the relays CR1-CR4 are respectively connected through lines 193, 194, 195, and 196 to one end of solenoids S1, S2, S3, and S4 and the opposite ends of which are respectively grounded through a common ground 198.

Each control relay and associated solenoid define a fluid valve actuating means respectively associated with solenoid operated valve spools 22, 24, 26, and 28 for friction devices or fluid pressure actuated friction devices C1 through C4.

Switch Control

Figure 1:
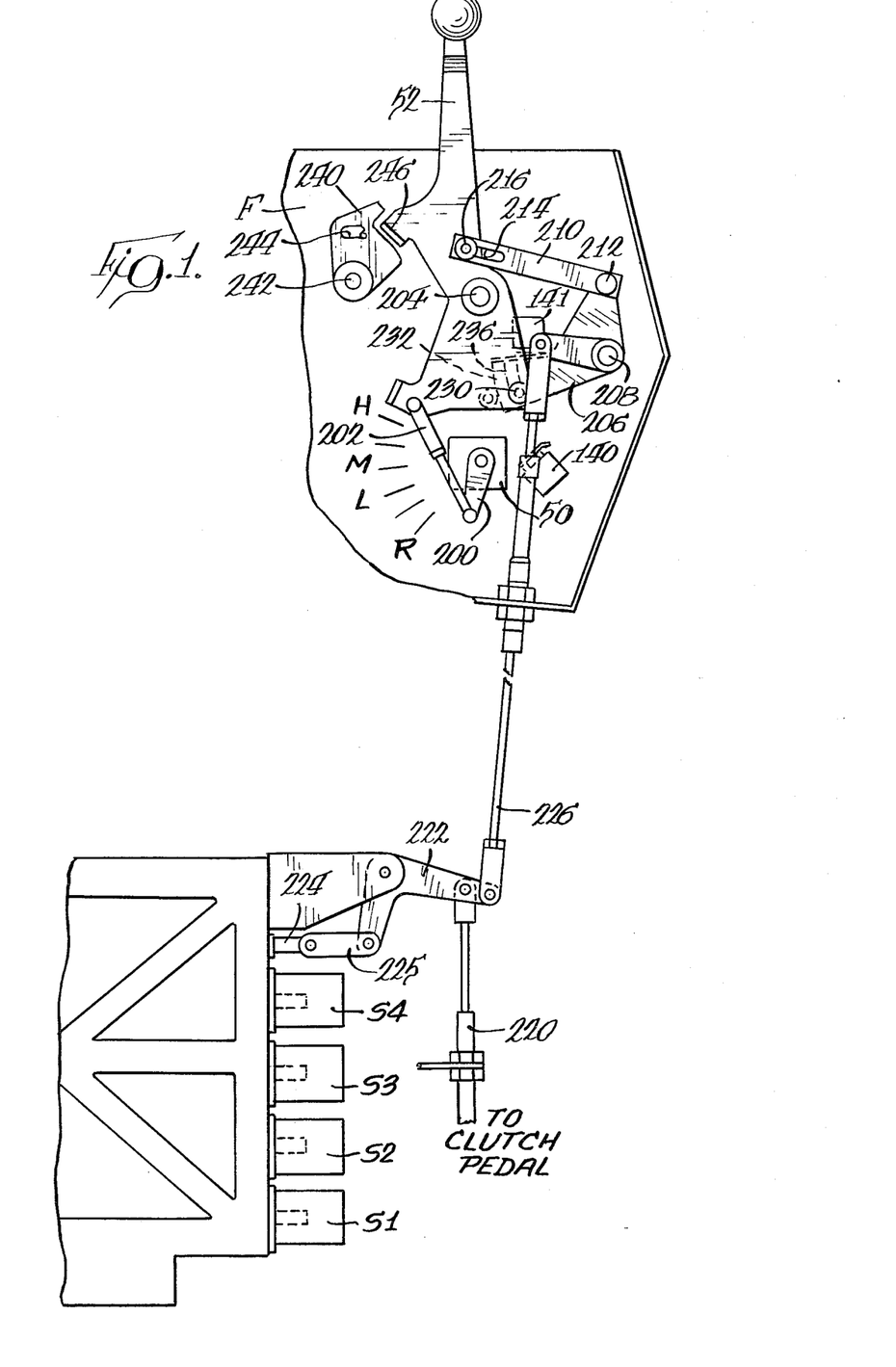
FIG. 1 of the drawings discloses the transmission control unit including the control lever and a plurality of independently actuated control valves.

As illustrated in FIG. 1, range switch 50 has an actuator arm 200 movable between a plurality of positions by control lever 52 which is connected thereto through an adjustable link 202. Control lever 52 is pivoted on a pivot pin 204 on frame F which also has a quadrant 206 pivoted thereon through a pivot pin 208. Quadrant 206 is connected to control lever 52 through a link 210 that is pivotally connected by pin 212 at one end to the quadrant 206 and has an elongated slot 214 at the opposite end which receives a pin 216 carried by control lever 52.

As illustrated in FIG. 1, mechanical switches 140 and 141, which are spring biased to an open position, are located in the pivotal path of movement of quadrant 206 and are respectively actuated when the control lever quadrant 206 is moved between extreme positions.

Control quadrant 206 is moved between positions through a clutch pedal (not shown) connected through a link or cable 220 to a bell crank 222. Bell crank 222 is connected to a modulating valve spool 224 in the transmission hydraulic circuit by a link 225 and is also connected to quadrant 206 through an adjustable link 226.

An interlock is produced between control lever 52 and quadrant 206 to prevent shifting into reverse while the modulating clutch is in a fully engaged position. Stated another way, clutch C2 and brake C4 must be engaged for reverse operation. In order to prevent inadvertent conditioning for reverse, control lever 52 has a pin 230 in alignment with an end surface or abutment 232 defined on the end of quadrant 206. Pin 230 is spaced from abutment 232 for all forward speeds but quadrant 206 must be moved to a second position before the control lever can be moved to "reverse" position. Once in the reverse position, a slot 236 is aligned with pin 230 to allow the quadrant 206 to be moved between positions and pressurize clutch C2 for reverse operation as will be explained later.

It should also be pointed out that the control lever is always moved to the lowest forward speed, whenever the clutch pedal is depressed. This is accomplished by link 210. Slot 214 in link 210 has a length such that pin 216 engages the right-hand end of the slot and forces lever 52 counterclockwise, whenever the clutch is depressed, which moves the quadrant to a second position engaging switch 140, as will be described later.

Operation of Twelve-Speed Control Circuit

As indicated above, clutch C2 and brake C4 must be engaged in order for the transmission to be geared for operation in reverse speed. This is accomplished by first depressing the clutch pedal to disengage modulating clutch or valve spool 224 and moved quadrant 206 to a second position. Initial movement of quadrant 206 releases switch arm 176 of switch 141 and allows it to move a second position while switch arm 143 is moved to an open position to interrupt the circuit to relay coil 154 of CR1. This initially de-energizes relay coil 184 for control relay CR3 and ultimately energizes relay coil 164 for control relay CR4 and simultaneously de-energizes relay coil 154 of CR1 when quadrant 206 reaches the second position. The range switch is now in the lowest forward speed, the rotation of output shaft 14 is interrupted, and clutch C2 is de-pressurized through modulating valve spool 224.

Figure 3A:
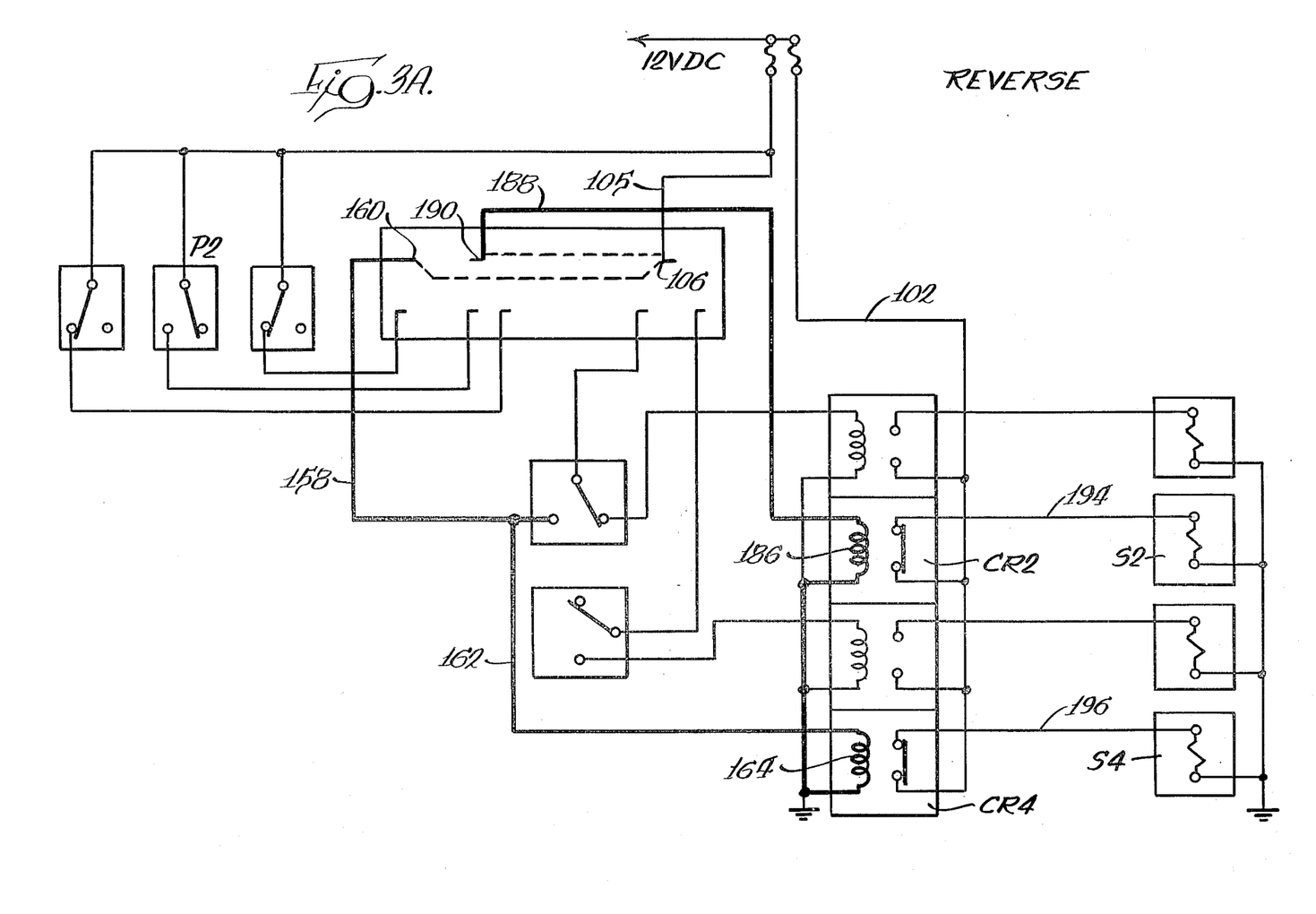
FIGS. 3A–D show the circuits for each of the four positions of the transmission control unit for a twelve speed operation.

Control lever can now be moved to a reverse position wherein slot 236 is located below pin 232. In this position contacts 160 and 190 in range switch 50 are connected to power contact 106 (FIG. 3A). Relay coil 164 of CR4 is energized through lines 158 and 162 to energize solenoid S4 and pressurize brake C4. Likewise, relay 186 of CR2 is energized through line 188 which energizes solenoid S2 but clutch C2 will not be pressurized because modulator valve spool 224 is depressed. The operator can then slowly release valve spool 224 to produce a controlled pressurization of clutch C2.

Of course, after the pressure in clutch C2 reaches a predetermined level, pressure switch P2 will open to move its switch arm to the second position which at this time performs no function since contact 128 in range switch 50 is not energized.

Figure 3B:
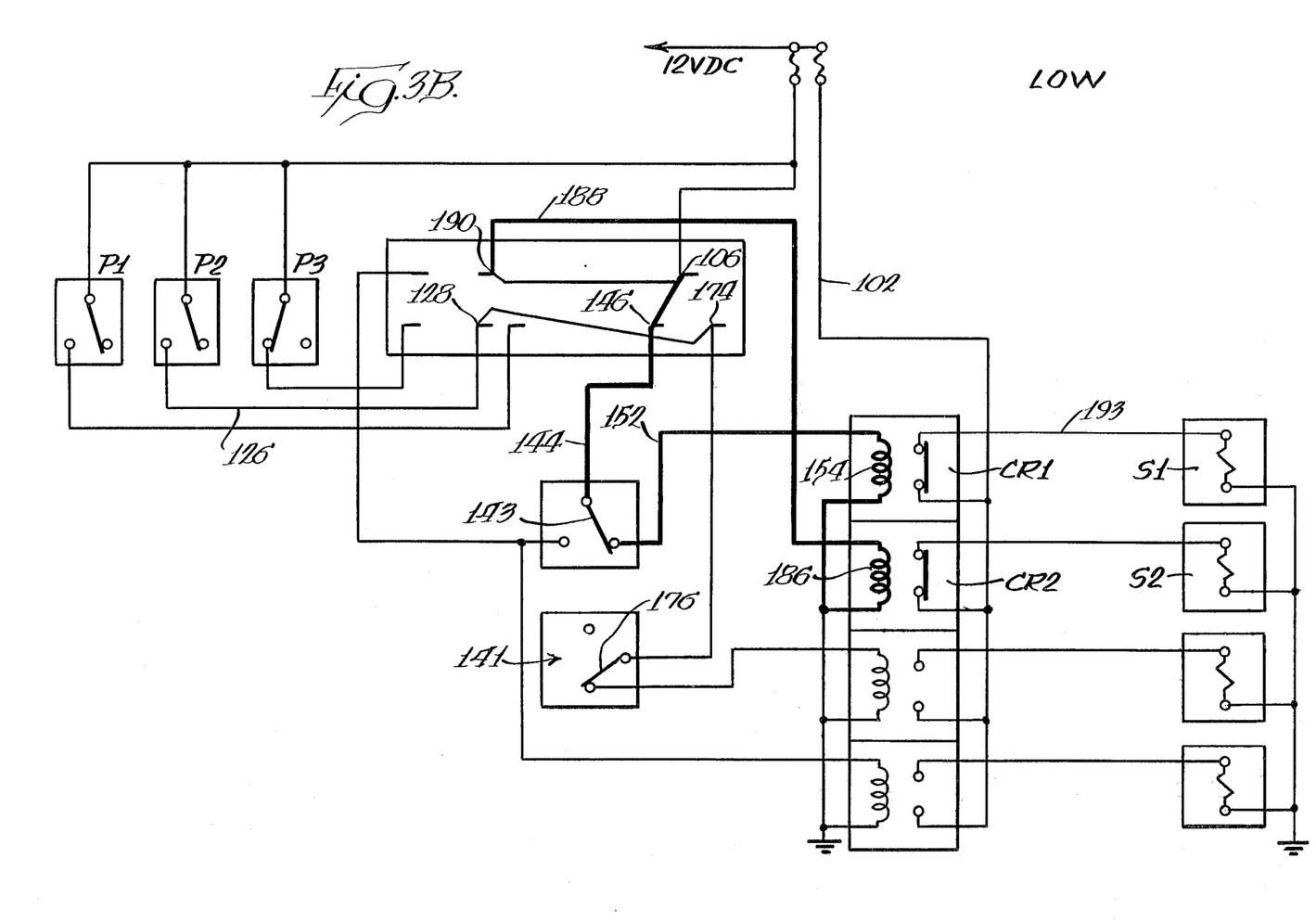

The position of the electric circuit for conditioning the transmission for "low" speed operation is illustrated in FIG. 3B wherein solenoids S1 and S2 are energized. In this position, contacts 106 and 146 in range switch 50 are interconnected to energize relay coil 154 through line 144, switch arm 143 and line 152. This will connect power line 102 to line 193 and energize solenoid S1 which will move valve 22 to a second position to pressurize brake C1.

Clutch C2 will be energized by having contact 190 connected with contact 106 to thereby energize relay coil 186 of control relay CR2 through line 188. This will connect power line 102 to line 194 and energize solenoid S2 which will move valve spool 24 to a second position to pressurize clutch C2. Contacts 128 and 174 in the range switch will be interconnected, but pressure switch P2 will be open to interrupt power to contact 128 and, therefore, control relay CR3 will not be energized.

Figure 3C:
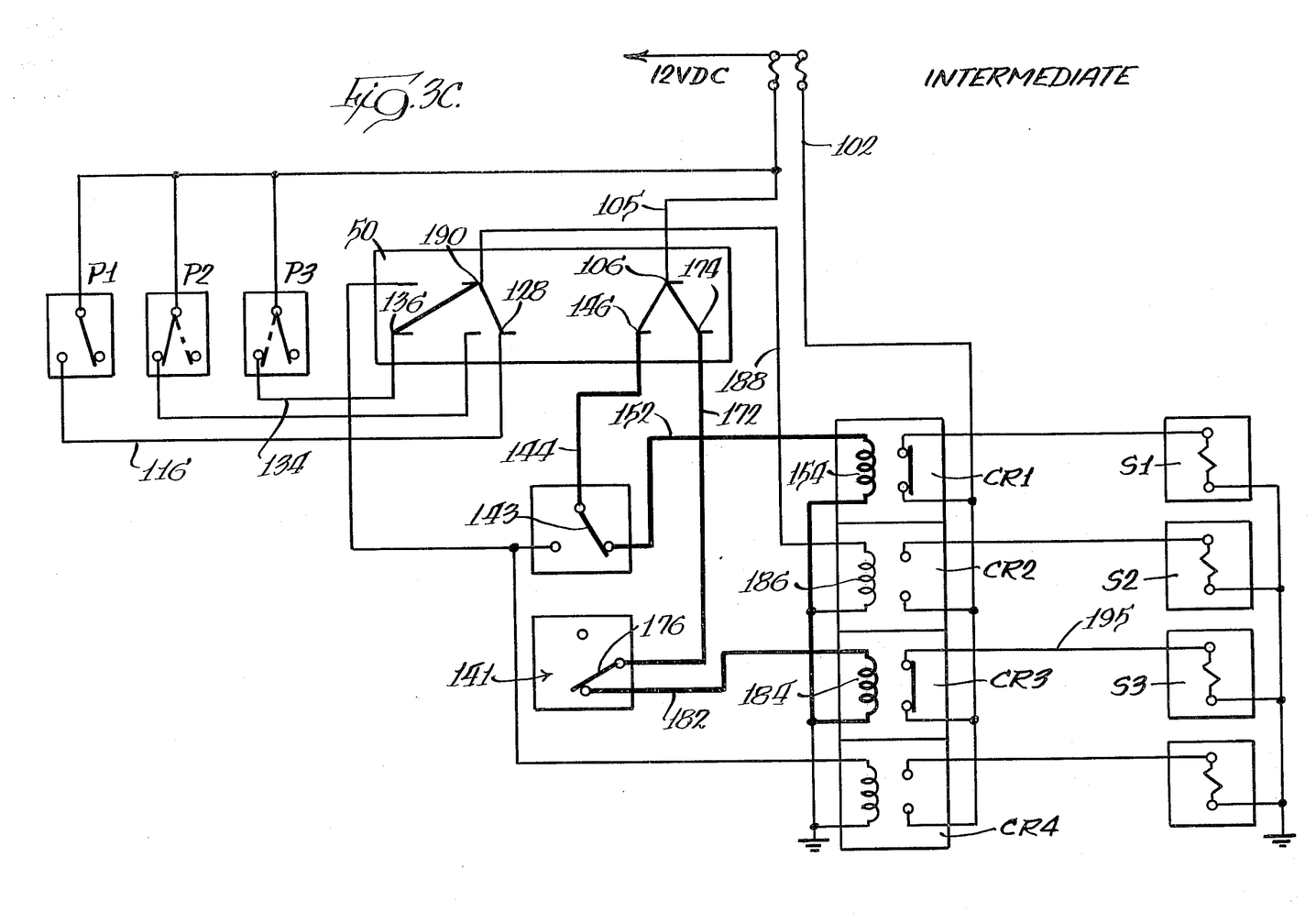

If the operator now wishes to condition the transmission for an "intermediate" range, clutch C2 must be disengaged and clutch C3 must be engaged. The circuitry for performing this function is illustrated in FIG. 3C. Brake C1 will remain engaged because contacts 106 and 146 in range switch 50 remain interconnected.

In the intermediate position, contact 174 of range switch 50 is connected to power contact 106 to thereby energize relay coil 184 through line 172, switch arm 176 of switch 141, and line 182. This will connect power line 102 to line 195 and energize solenoid S3 to pressurize clutch C3.

One of the significant features of the present invention is the fact that solenoid S2 will remain energized until the pressure of the fluid in clutch C3 reaches a certain predetermined level. This is accomplished by having contacts 136 and 190 in range switch 50 interconnected when the range switch is moved to the intermediate position. Thus, relay coil 186 will remain energized through pressure switch P3, line 134 and line 188. However, when the pressure in clutch C3 reaches a predetermined level, pressure switch P3 will move to open dotted-line position in FIG. 3C and interrupt the circuit to relay coil 186 and thereby de-energize solenoid S2.

As indicated above, this feature is extremely significant in that the low range of operation, specifically clutch C2, remains pressurized until the clutch C3 is at a certain pressure level which will insure that there is no interruption in the power train as the vehicle is shifted from the low to the intermediate range. When solenoid S2 becomes de-energized, the pressure in clutch C2 drops and pressure switch P2 will return to its normally closed dotted-line position, for a purpose that will be described later.

It should be noted that contact 190 is also connected to contact 128 but no circuit is completed because pressure switch P1 is open. The significance of this will become apparent later.

In order to shift from the intermediate to the high range, brake C1 must be disengaged and clutch C2 engaged while clutch C3 remains engaged. In the high position for range switch 50 (FIG. 3D) contacts 106 and 174 will remain connected to energize relay coil 184 and maintain clutch C3 in a pressurized condition. When the range switch is moved to the high position, contact 190 is connected to power contact 106 and relay coil 186 of control relay CR2 becomes energized to connect power line 102 to line 194. This will begin a pressure build-up in the chamber for clutch C2.

Figure 3D:
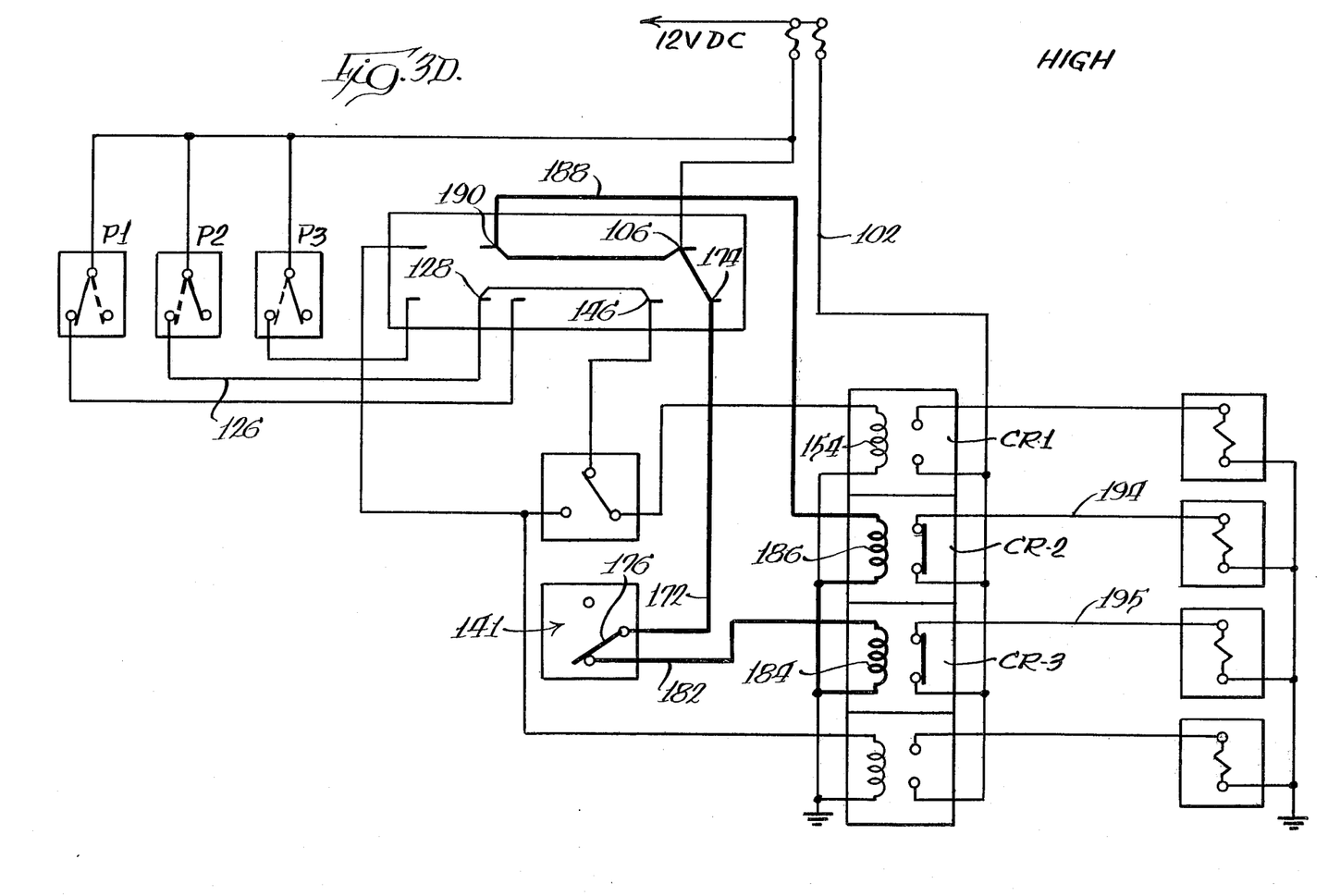

At the same time, contact 128 of range switch 50 is connected to contact 146 so that solenoid 154 remains energized and brake C1 remains pressurized until the pressure in clutch C2 reaches a predetermined level at which time pressure switch P2 opens and the circuit is interrupted to solenoid S1. This again provides a power shift and prevents interruption of the connection in the power train until the clutch C3 is pressurized to a predetermined level and the transmission is conditioned for high speed operation.

Considering now the operation of the transmission unit as the control lever is moved from the high position to the intermediate position, clutch C1 must be engaged while clutch C2 must be disengaged. However, again it is desirable to maintain the clutch C2 in an engaged position until brake C1 is fully engaged.

When control lever 52 is moved to the intermediate position, the range switch contacts will be as illustrated in FIG. 3C. In this position, power contact 106 is connected to contacts 146 and 174 to energize relay coils 154 and 184 and thereby energize solenoids S1 and S3. Relay coil 186 of control relay CR2 remains temporarily energized through closed pressure switch P1, line 116 and line 188. This will then provide the same power shift where clutch C2 remains pressurized until brake C1 reaches a certain pressure level.

When shifting from the intermediate range to the low range, the range switch reverts to the position shown in FIG. 3B, where power contact 106 is connected to contacts 146 and 190 to energize relay coils 154 and 186 of control relays CR1 and CR2. Control relay CR3 remains energized through the closed contacts of pressure switch P2, line 126, contacts 128 and 174, line 172, switch arm 176, and line 182. When pressure switch P2 opens, the circuit is interrupted to relay coil 184 and clutch C3 becomes depressurized.

In summary, the electric control circuit described above is capable of conditioning the planetary transmission unit for three forward speed ranges of operation and one reverse speed range. When coupled with a sliding gear transmission unit of the type disclosed in the Bislew patent, which has four different speeds, the vehicle can be operated at 12 forward speeds and a plurality of reverse speeds depending upon the desires of the designer.

For safety reasons, it is preferable that the control system be designed such that the planetary gear transmission unit cannot be shifted into reverse when the sliding gear unit is in the position for the highest speed. This is accomplished by a mechanism illustrated in FIG. 1 consisting of a reverse lockout quadrant 240 pivoted on a pin 242 and moved by a link 244 which is mechanically connected to the shifting mechanism for the sliding gear unit (not shown). Thus, when the sliding gear transmission unit is in the fourth or highest speed, the reverse lockout quadrant 240 is disposed in the path of an abutment 246 on control lever 52 to prevent counterclockwise rotation of the control lever to the reverse position.

Twenty-Four-Speed Transmission

Figure 4:
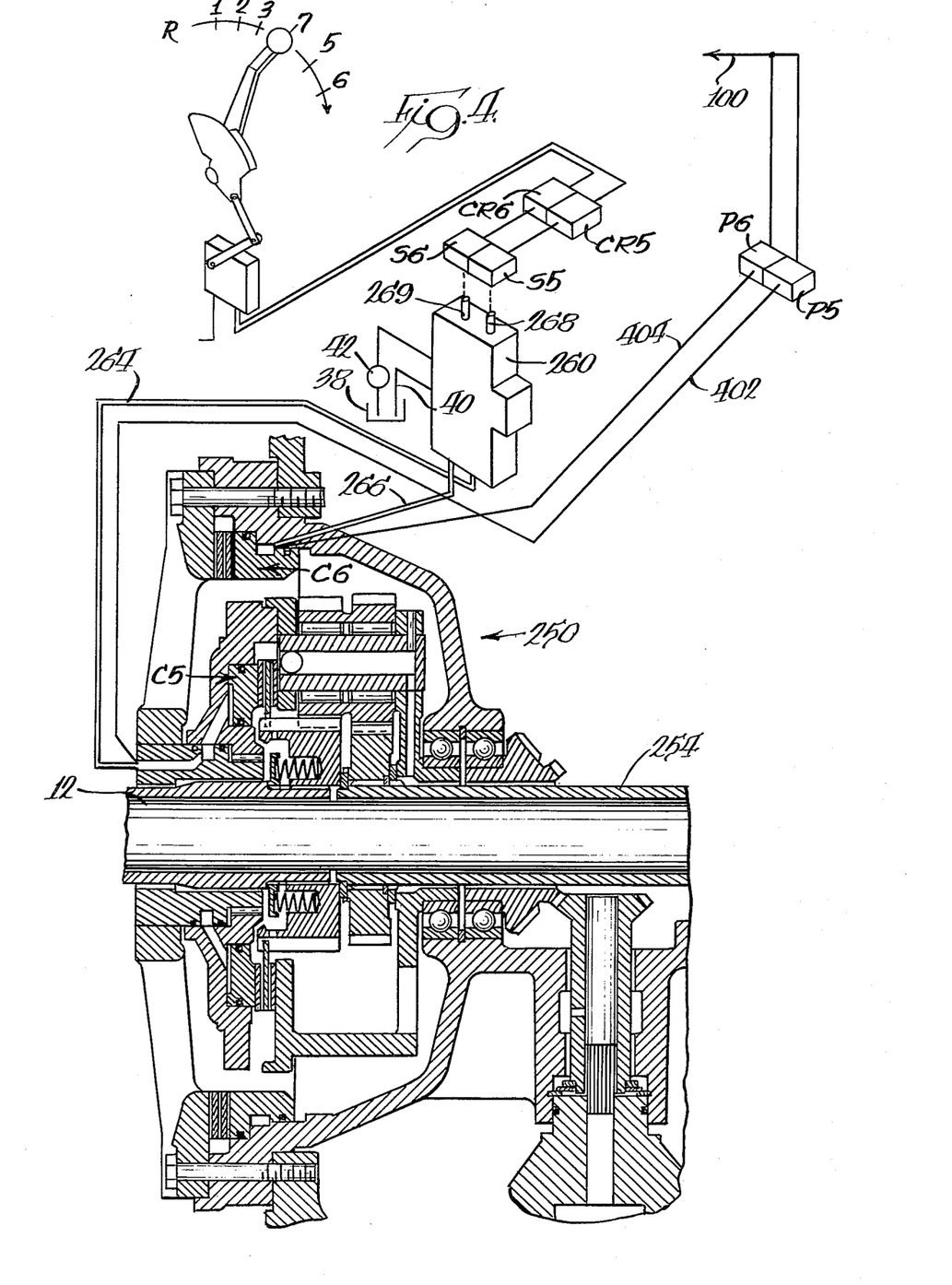
FIG. 4 is a view similar to FIG. 2 showing additional components necessary to double the number of speeds for the transmission.

With only minor modification of the mechanical aspects of the transmission and the electrical control circuit, the transmission unit and control system so far described can be modified to be capable of operating at twenty-four different forward speeds. The mechanical modification of the transmission unit is illustrated in FIG. 4 and consists of a two-speed planetary transmission unit 250 having an input 254 connected to the engine drive shaft and its output shaft 12 providing the input to the planetary unit described above in connection with FIG. 2. Two-speed planetary transmission unit 250 has two friction devices C5 and C6 interposed between shafts or sleeves 254 and 12. When clutch C5 is pressurized, there will be a direct driving relationship between input sleeve 254 and output sleeve 12, while when brake C6 is engaged, output shaft 12 will be driven at a lower speed than input shaft 254. Since the planetary unit 250 forms no part of the present invention, a further detailed description thereof does not appear to be necessary.

The hydraulic circuit for pressurizing friction devices C5 and C6 consists of a valve bank 260 that may be part of valve bank 20 having pressurized fluid supplied thereto from pump 42 and connected to reservoir 38 through line 40. Valve bank 260 is connected via lines 264 and 266 to the respective friction devices C5 and C6. For purposes of illustration, valve bank 260 includes two valve spools 268 and 269 respectively associated with friction devices C5 and C6 so that when energized, the respective clutches will be pressurized.

The respective valve spools 268 and 269 are respectively moved between positions by solenoids S5 and S6.

Preferred Form of Twenty-Four-Speed Transmission

Figure 5:
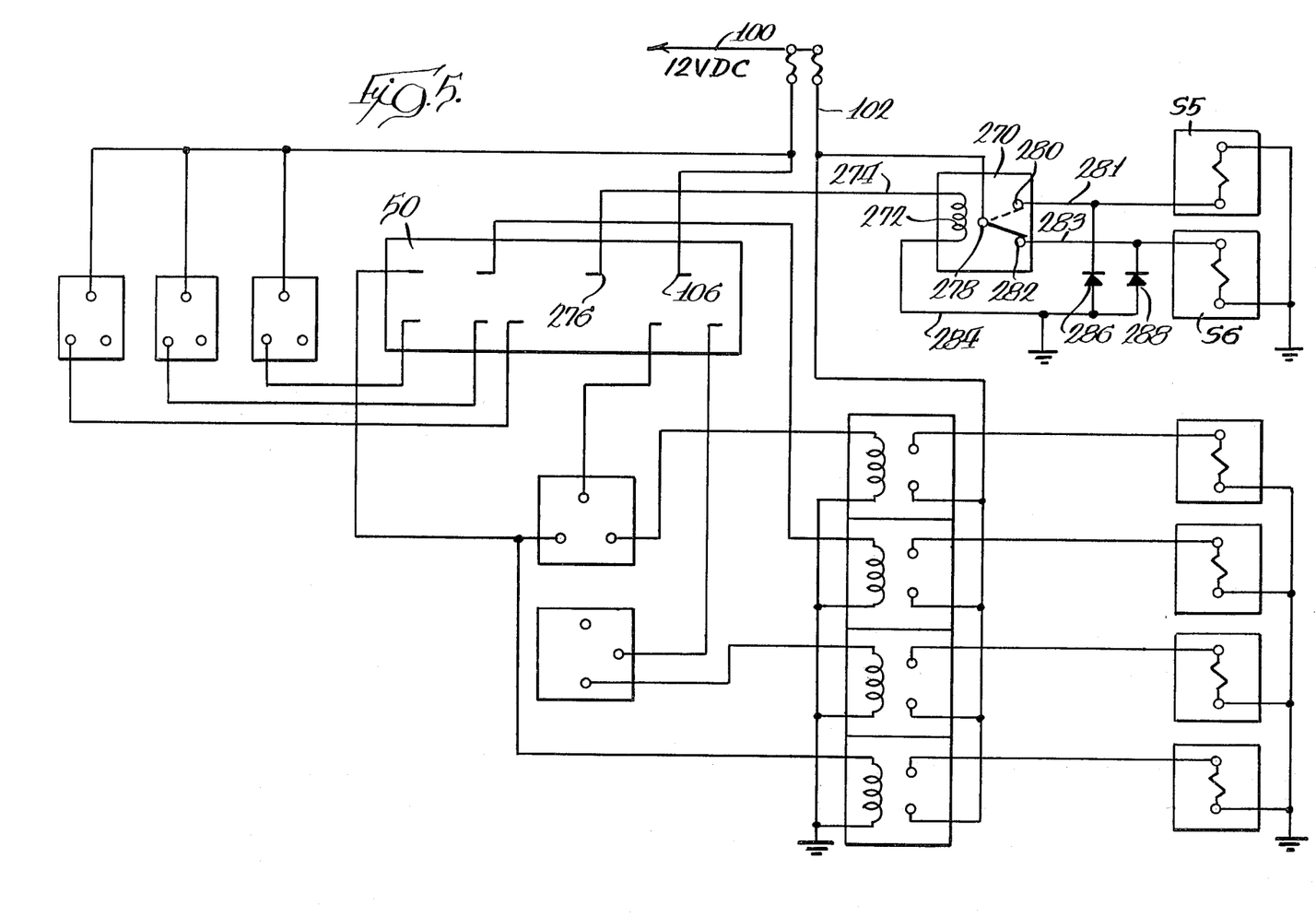
FIG. 5 shows an electric circuit for operating the modified transmission.

The preferred form of electric circuit for a twenty-four-speed operation includes all of the circuitry shown in FIG. 3 and a circuit for operating solenoids S5 and S6. As illustrated in FIG. 5, the circuit for solenoids S5 and S6 consists of a single relay 270 for controlling the power supply from line 102 to either solenoid S5 or S6. Control relay 270 has a relay coil 272 connected by a line 274 to a contact 276 in range switch 50. Line 102 of power source 100 is connected directly to the input contact 278 of control relay 270 and a first output contact 280 is connected by line 281 to solenoid S5 while a second output contact 282 is connected by line 283 to solenoid S6. Control relay 270 is grounded through a line 284 and a pair of diodes 286 and 288 are respectively interposed between lines 281 and 283 and ground line 284.

In the modified form of circuit, the control lever 52 has six forward positions with each pair of forward positions respectively defining low, intermediate and high speed ranges of operation, as described more fully in connection with the twelve-speed transmission. In the first position for control lever 52, relay contact 276 in range switch 50 is connected to power contact 106 so that control relay coil 272 is energized which moves the switch arm to a position where solenoid S6 is energized and planetary transmission 250 is geared for underdrive operation. When the control lever is moved from the first to the second position, contact 276 becomes de-energized and the control relay arm interconnects lines 102 and 281 to energize solenoid S5 which provides a direct drive between sleeves 12, 254 (see FIG. 4) and the output of the transmission is at the higher of the two-speeds in the low range.

In each shifting instance, the respective diodes 286 and 288 act as time delay means and maintain the solenoid to be de-energized energized a sufficient time to allow fluid to enter the friction device to be engaged and provide a power shift.

The same sequence of events will occur when the control lever is moved to the third and fourth positions wherein the transmission is operated in an intermediate range and in the fifth and sixth positions wherein the transmission is operated in the high range. Thus, with just minimum modification of the control circuit and the addition of a conventional two-speed planetary transmission unit, the control system can be designed for twenty-four-speed operation.

Figure 6:
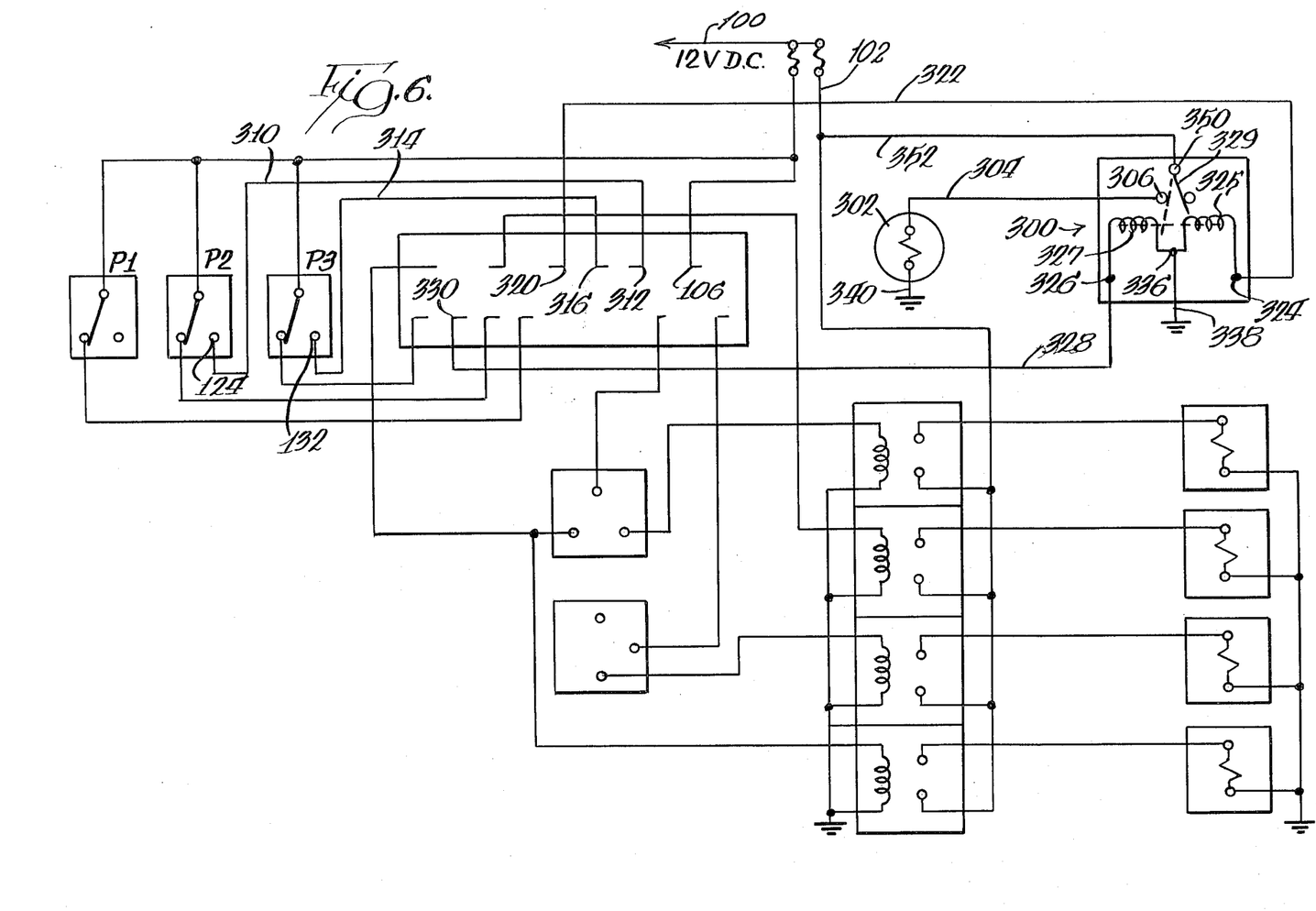
FIG. 6 is a further modified circuit that can be added to the circuit of FIG. 3 to provide additional speeds for the transmission.

FIG. 6 Embodiment of Twenty-Four-Speed Operation

The basic circuit illustrated in FIG. 3 can likewise be modified to double the number of output speeds of the planetary transmission unit merely by incorporating two-speed planetary unit 250 between the engine and input shaft 12 of planetary transmission unit 10 and utilizing the circuit illustrated in FIG. 6.

The control of pressurization of friction devices C5 and C6 can again be incorporated into the electric control system illustrated in FIG. 3 with only minimum modification thereof consisting of a relay 300 having a plurality of contacts and a rotary solenoid 302 which has a link (not shown) connected to a two-position valve spool which replaces valves 268 and 269. Solenoid 302 is connected by line 304 to a contact 306 in relay 300.

Pressure switch P2 has its normally open contact 124 connected by a line 310 to a contact 312 in range switch 50 while normally open contact 132 of pressure switch P3 is connected by line 314 to contact 316. A further contact 320 in range switch 50 is connected by a line 322 to an input contact 324 which is connected to a relay coil 325 in control relay 300. A second input contact 326 for relay coil 327 is connected by a line 328 to a contact 330.

Relay coils 325 and 327 cooperate with a switch arm 329 to move it between the solid and dotted-line positions illustrated in FIG. 6. Both relay coils 325 and 327 have a common ground contact 336 connected by line 338 to ground while solenoid 302 is grounded through line 340.

Power is supplied from power line 102 to an input contact 350 through line 352 with switch arm 329 connected to contact 350 in relay 300. Thus, solenoid 302 is energized in one position and de-energized in the second position. This is accomplished by movement of switch arm 329 between first and second positions.

Referring to FIG. 6, to provide an underdrive relation in planetary transmission 250, contact 330 in range switch 50 is connected to power contact 106 to energize relay coil 327. This will move switch arm 329 to the dotted-line position and complete a circuit between contacts 306 and 350 in relay 300 to connect line 304 directly with power line 102 via line 352 to energize solenoid 302 and thereby move the valve spool to a position where brake C6 is pressurized. To summarize, in the lowermost or underdrive speed for the low range for the transmission, the actuating circuit for energizing solenoid 302 includes contact 330, line 328, and contact 326. The circuit for supplying power to solenoid 302 includes contacts 306 and 350 and lines 304 and 352.

Direct drive in the low range is achieved by moving the control lever to the next position wherein contacts 106 and 320 in range switch 50 are interconnected which energizes relay coil 325 to move switch arm 329 to the solid-line position. This will de-energize solenoid 302 and cause the spring in rotary solenoid 302 to move the valve spool to a first position wherein clutch C5 is pressurized to provide a direct drive from the engine output shaft into the planetary transmission shaft 12.

Moving the control lever to a third position will cause the main planetary transmission unit 10 to shift into the intermediate speed illustrated in FIG. 3C and will also again energize solenoid 302 through the circuit described above. As indicated above, in the intermediate range, brake C1 and clutch C3 are pressurized which means that pressure switch P3 is in the second dotted-line position illustrated in FIG. 6, and a circuit is completed through line 314, contacts 316 and 330 in range switch 50, and line 328 to energize relay coil 327 in relay 300, and thereby energize solenoid 302. Moving the control lever to the next or fourth position, the signal to contact 330 within range switch 50 will be interrupted and contact 320 will be connected to power contact 106 to energize relay coil 325 and move switch arm 329 to the solid-line position. This will de-energize solenoid 302 to pressurized clutch C5 and provide a direct drive between the engine and input shaft 12.

Shifting of the control lever to the lowermost high speed will again energize solenoid 302 through a normally open contact 124 of pressure switch P2, which is now open because clutch C2 is pressurized, through line 310, contact 312, contact 330 and line 328, as described above. Movement of the control lever to a furthermost or sixth position will de-energize solenoid 302 and thereby allow the spring to move the valve spool to a position wherein clutch C5 is pressurized.

Alternate Form of Twenty-Four-Speed Electric Control

Figure 7:
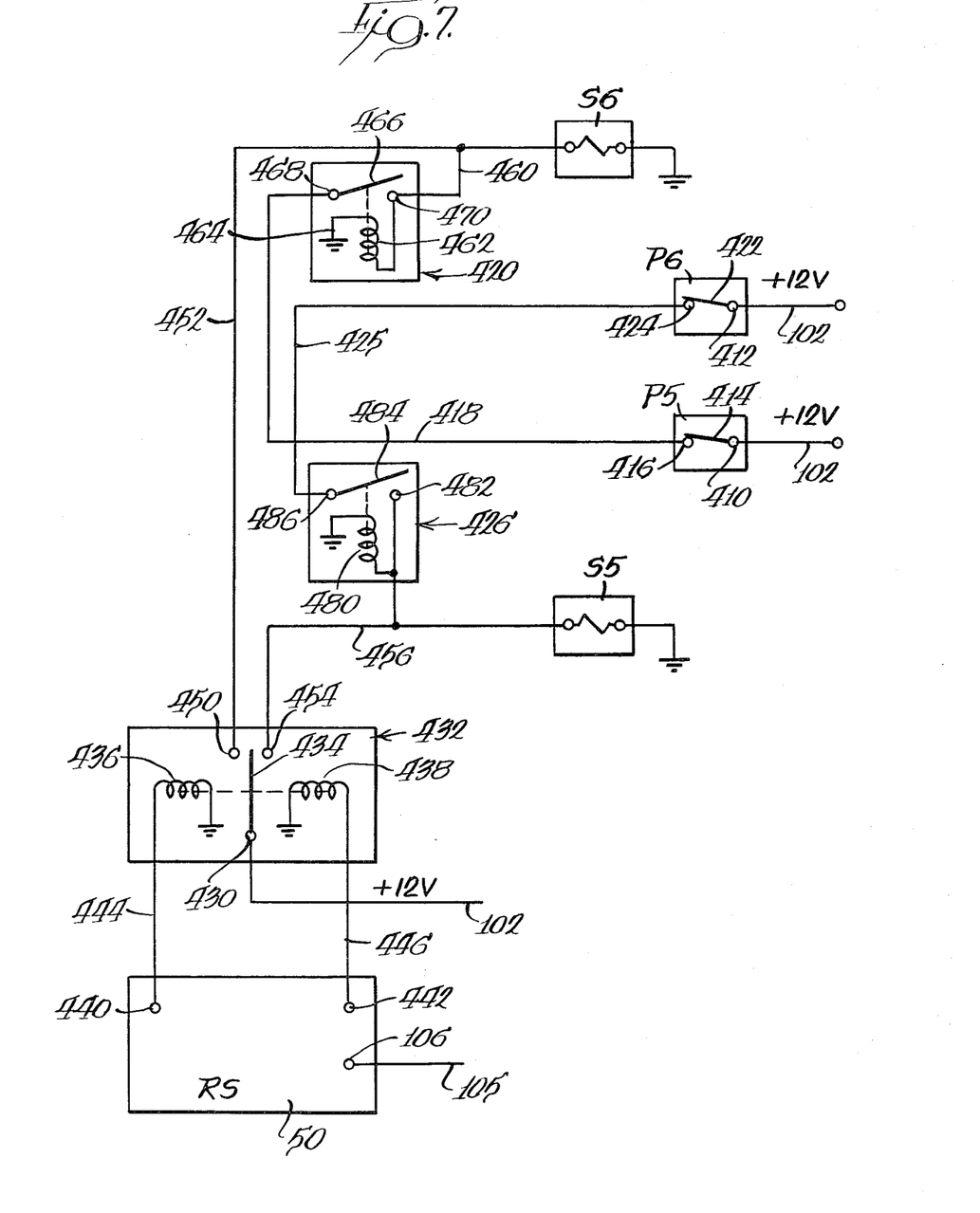
FIG. 7 is a further modified form of the electric circuit for obtaining additional speeds.

Planetary transmission unit 250 can likewise be controlled through an alternate circuit wherein the previously energized solenoid valve remains energized until the pressure level in the newly energized clutch reaches a predetermined level, which is sensed by pressure switches, as will now be described. Referring to FIGS. 4 and 7 of the drawings, the hydraulic circuit described above in connection with the twenty-four-speed transmission remains the same except that the pressure in clutch C5 and brake C6 is sensed through pressure switches P5 and P6, which respectively have pressure sensing transducers connected to the friction devices through lines 402 and 404.

Referring to FIG. 7, the respective pressure switches P5 and P6 have input contacts 410 and 412 respectively connected directly to main power line 102. Pressure switch P5 has a switch arm 414 which is in engagement with a contact 416 connected by a line 418 to a holding relay 420. Likewise, pressure switch P6 has a switch arm 422 in contact with a normally closed contact 424 that is connected to a holding relay 426.

An input contact 430 of a control relay 432 is connected directly to power line 102 and has a switch arm 434 movable between first and second positions. Switch arm 434 is moved between positions through a pair of relay coils 436 and 438 respectively having one end grounded and opposite ends connected to contacts 440 and 442 in range switch 50 through lines 444 and 446.

Control relay 432 has a first output contact 450 connected via line 452 to a solenoid S6 and a second output contact 454 connected by line 456 to solenoid S5. Line 452 is connected via a branch line 460 to one end of relay coil 462 in holding relay 420. The opposite end of relay coil 462 is connected to a ground 464 and has a switch arm 466 associated therewith for connecting an input contact 468 to an output contact 470.

Also, line 456 leading to solenoid S5 is connected to one end of a relay coil 480 in holding relay 426 and is also connected to a contact 482. Holding relay 426 has a switch arm 484 moved by relay coil 480 and connected to input contact 486 which has power line 425 connected thereto.

The operation of the embodiment illustrated in FIG. 7 is similar to that described in connection with FIG. 6 in that solenoids S5 and S6 are alternately energized to provide a direct drive and an underdrive relationship between input shaft 254 and output shaft 12 of planetary transmission 250. This is accomplished for each of the three forward speed ranges as well as the reverse speed range by alternately connecting power contact 106 in range switch 50 with contacts 440 and 442.

Since the operation for each of the speed ranges is identical only one will be described. Assuming that the transmission is conditioned for the first speed in the low range, power contact 106 is connected to contact 440 to energize relay coil 436 in relay 432 and thereby energize solenoid S6 through line 452. At the same time, holding relay coil 462 of holding relay 420 will be energized to close switch arm 466 and interconnect contacts 468 and 470 so that power line 102 will also be connected to solenoid S6 through pressure switch P5.

Movement of the contact lever to the second speed in the low range will disconnect contact 440 and connect contact 442 to power contact 106 in range switch 50 which will energize relay coil 438 and supply power to line 456 which will energize solenoid S5. However, solenoid S6 will remain energized through switch arm 414 of pressure switch P5, line 418 and switch arm 466. This condition will remain until the pressure switch P5 senses a predetermined pressure value in clutch C5 at which time the switch arm will be moved to an open condition to interrupt the circuit to solenoid S6.

At the same time an alternate circuit is also completed through pressure switch arm 422, line 425 holding relay 426 to solenoid S5. Thus, the holding relays 420 and 426 will provide a power shift between clutch C5 and brake C6 as the solenoids S5 and S6 are alternately energized and the solenoid to be de-energized will remain energized through the pressure switch.

In summary, the electric circuits described above provide a unique power shift as the transmission is shifted from one speed to another. Of course, various modifications come to mind without departing from the spirit of the invention. For example, mechanical switches 140, 141 could be replaced with one or more pressure switches that could be operated by sensing the pressure of fluid that operates the transmission. Also, some other types of switches could be substituted for range switch 50. A microprocessor unit could also be used to replace the range switch 50. This could result in changes to the range lever and reverse interlock lever system. Push button switches might be used.

What is claimed is:

1. In a multi-speed power transmission having an output shaft, an input shaft, a plurality of engageable fluid pressure-actuatable friction devices for connecting said output shaft to said input shaft and providing a plurality of rotational speeds for the output shaft in a given direction, and a control system for said transmission, said control system including a speed selector circuit, a plurality of fluid valve means responsive to each selector circuit, each adapted to actuate one of said friction devices, and pressure transducer means associated with each said friction devices for providing an individual indication of fluid pressure operating on each of said friction devices, said speed selector circuit comprising: an electric power source, a plurality of fluid valve actuating means each operably associated with one of said fluid valve means, speed selector switch means for energizing from said power source a predetermined number of said fluid valve actuating means, fluid pressure responsive holding means individually responsive to each of said pressure transducer means for maintaining a previously energized fluid valve actuating means in an energized state until such time when a subsequently energized fluid valve actuating means has caused fluid pressure operating on the associated friction device to reach a predetermined value, whereby the power transmission shifts from one speed to another without delay due to the actuation and de-actuation of said friction device.

2. The power transmission as defined in claim 1, in which:
   (a) there are at least three fluid pressure-actuated friction devices providing three rotational speed ranges for said output shaft with an equal number of associated fluid valve means and pressure transducer means; and
   (b) said speed selector circuit includes a fluid valve actuating means and a fluid pressure responsive holding means for each fluid valve means.

3. The power transmission as defined in claim 2, including:
   a fourth fluid pressure-actuated friction device, and wherein two friction devices are simultaneously engaged to define three forward rotational speed ranges and one reverse rotational speed range, and
   a fourth fluid valve actuating means, operatively associated with the speed selector circuit, for said fourth fluid pressure-actuated friction device.

4. The power transmission as defined in claim 3, wherein the speed selector circuit includes independently-actuatable switch means, between said speed selector switch means and the fluid valve actuating means, for selectively de-energizing two of the four fluid valve actuating means.

5. The power transmission as defined in claim 3, further including an independently-actuatable single-pole, double-throw switch means in the speed selector circuit,
   (a) between said speed selector switch means and one of said fluid valve actuating means, for a forward rotational speed range and
   (b) between said speed selector switch means and the fluid valve actuating means, for the reverse rotational speed range,
said independently-actuated single-pole, double-throw switch means being operably connected to de-energize the fluid valve actuating means for said forward rotational speed range while energizing the fluid valve actuating means stopping rotation of the power transmission output shaft.

6. The power transmission as defined in claim 1, in which each said fluid valve means is a spool valve, and each said fluid valve actuating means is a control relay operably connected to a solenoid adapted to position the valve spool within said spool valve.

7. The power transmission as defined in claim 1, in which said speed selector switch means is a rotary switch.

8. The power transmission as defined in claim 1, wherein said fluid pressure responsive holding means maintains a previously energized fluid valve actuating means in an energized state until such time when power transmitted to the output shaft by means of a friction device engaged in response to said subsequently energized fluid valve actuating means reaches substantially the same valve as the power transmitted by said previously engaged friction device.

9. The power transmission in accordance with claim 1, wherein rotational speed of said input shaft is determined by an auxiliary multi-speed planetary power transmission operably associated with a plurality of friction devices, and wherein said speed selector switch means is energizes only one of said friction devices at a time.

10. A control system for a multi-speed transmission having at least three fluid operated friction devices engageable by fluid provided by a source of pressurized fluid, and in which at least two of said friction devices must be engaged for each speed range, and in which one of the engaged friction devices must be disengaged and another disengaged friction device must be engaged to shift from one speed range to another, said control system including an electric circuit for controlling flow of pressurized fluid to and from said friction devices, said electric circuit comprising:

multiposition switch means for setting the speed ranges of said transmission, first means, responsive to a shift in said switch means, for supplying pressurized fluid to the friction device to be engaged, and second means for precluding disengagement of the engaged friction device until the fluid pressure in said friction device to be engaged reaches a predetermined value to produce a power shift between the respective speed ranges for said transmission, whereby the speed of the transmission is changed without delay due to the engagement and disengagement of the friction devices.

11. A control system as defined in claim 10, in which said first means includes at least first and second pressure responsive means respectively sensing pressure of fluid in at least two friction devices.

12. A control system as defined in claim 10, in which said multi-speed transmission has four friction devices and first, second and third pressure responsive means for sensing pressure of fluid in the first, second and third friction devices respectively so that said transmission can be operated in at least three forward speed ranges and at least one reverse speed range.

13. A control system as defined in claim 12, in which said multi-speed transmission includes at least two additional friction devices respectively engageable for operating said transmission in a plurality of speeds for each speed range.

14. A control system as defined in claim 13, in which said electric circuit includes further means for maintaining the engaged frictional device engaged until the pressure of the fluid in the other additional friction device reaches a certain value.

15. A control system as defined in claim 10, in which said first means includes a solenoid operated valve for each friction device, and control relay means for each solenoid operated valve with the respective control relay means being energized when said multiposition switch means is moved between positions.

16. A control system as defined in claim 15, in which said second means includes a separate pressure responsive switch for at least two of said friction devices.

* * * * *